Aug. 19, 1924.
W. S. HARLEY
BRAKE
Filed Dec. 13, 1920    2 Sheets-Sheet 1
1,505,335
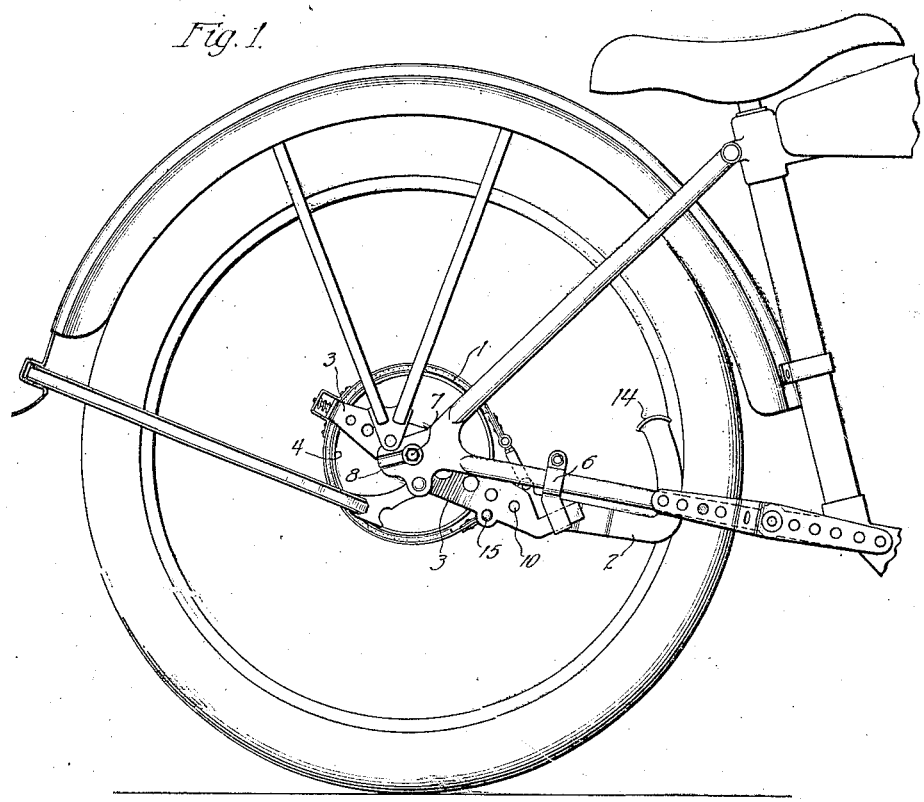
Fig. 1.
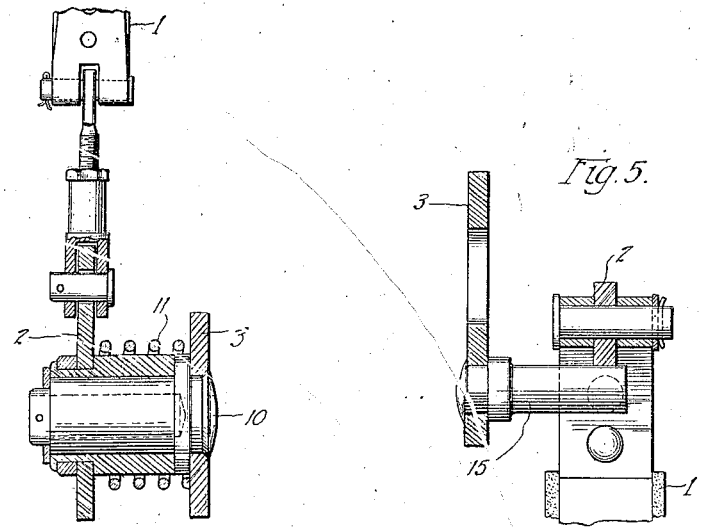
Fig. 4.
Fig. 5.
Inventor
William S. Harley.
By Edwin B. H. Tower Atty Aug. 19, 1924.  W. S. HARLEY  1,505,335
BRAKE
Filed Dec. 13, 1920   2 Sheets-Sheet 2
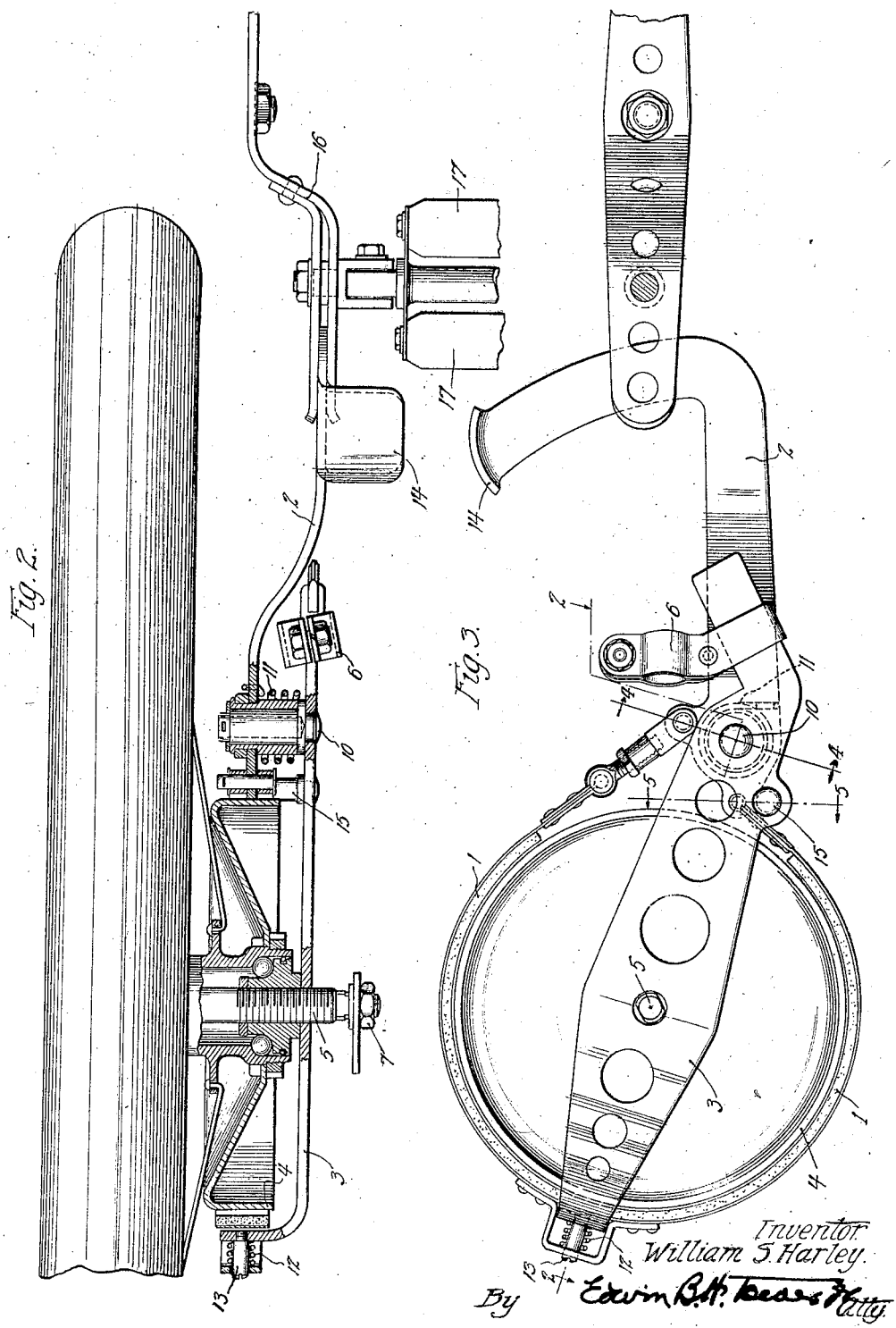

Patented Aug. 19, 1924.

1,505,335

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN, A CORPORATION OF WISCONSIN.

BRAKE.

Application filed December 13, 1920. Serial No. 430,256.

*To all whom it may concern:*

Be it known that I, WILLIAM S. HARLEY, a citizen of the United States, residing at Milwaukee, in the county of Milwaukee and State of Wisconsin, have invented new and useful Improvements in Brakes, of which the following is a specification.

This invention relates to a brake for vehicles.

More particularly it relates to a unitary braking mechanism for use on motorcycles, bicycles, scooters and other vehicles.

An object of the invention is to provide a brake which may be attached to and detached from a vehicle expeditiously.

Another object is to provide a brake and brake actuating lever which may be attached and detached as a unit.

Another object is to provide a wheel and brake mechanism which may be attached to and detached from a vehicle as a unit.

Another object is to provide a brake which may be attached and detached without disconnecting any joints.

Another object is to provide a brake which is efficient and reliable.

Another object is to provide a brake which may be readily and economically manufactured.

Other objects and advantages will hereinafter appear.

According to the invention there is provided a mechanism comprising a brake and an actuating lever therefor mounted on a bracket and in operative relation to a brake drum which is fastened to a vehicle wheel, the bracket, wheel and attached parts being removable from the vehicle as a unit.

The views of the accompanying drawings are as follows:

Fig. 1 is a side elevation of the rear part of a motorcycle;

Fig. 2 is an oblique cross section through the brake on line 2—2 of Fig. 3;

Fig. 3 is an enlarged side elevation of the brake and brake operating lever attached to a bracket and in operative relation to a brake drum;

Fig. 4 is a section on line 4—4 of Fig. 3; and

Fig. 5 is a section on line 5—5 of Fig. 3.

A brake band 1 and a brake actuating lever 2 are supported by a bracket 3 in operative relation to a brake drum 4 which is fastened to the rear wheel of a cycle, the bracket being supported on the wheel axle 5, with one end held by a clamp 6 attached to the motorcycle frame to prevent rotation of the bracket.

The wheel, brake drum and bracket supporting the brake and brake actuating lever are mounted as a unit on the wheel axle 5.

The unitary structure may be attached to or detached from the motorcycle frame very quickly.

To detach the wheel and brake mechanism it is only necessary to loosen a nut 7 on each end of the rear wheel axle, pull the wheel axle out of the slot 8 in the motorcyle frame and simultaneously withdraw the end of the bracket 3 from the clamp 6.

To attach the wheel and brake mechanism it is, of course, only necessary to do the converse of that which takes place in detaching the wheel and brake mechanism.

The brake actuating lever 2 is pivoted on a stud 10 fastened to the bracket 3 and is connected to both ends of the brake band 1, so that when the lever 2 is actuated the upper part of the brake band is pulled down against the brake drum and the lower part of the brake band is drawn up against the drum.

A spring 11 surrounding the stud 10 acts upon the brake actuating lever and normally holds the rear end thereof against a back stop pin 15 and consequently tends to hold the brake band 1 free from the brake drum 4.

Another spring 12 carried by a post 13 attached to the bracket 3 also tends to hold the brake band free from the brake drum.

The brake actuating lever 2 is shown provided with a foot pedal 14.

A support 16 attached to the motorcycle frame carries a foot rest in the form of a pedal 17 and is bifurcated at its free end and serves as a guide for the brake lever 2.

Motorcycles and other vehicles when used for racing are subjected to very severe strains and stresses and consequently parts are likely to be broken or tires deflated. A great part of the strain or stress on a motorcycle is placed on the rear tire and consequently tire failure is quite common. Therefore, it is imperative that the rear wheel and associated parts, including the brake mechanism, be attached to the main frame in such manner that they may be readily detached as a unit and replaced by other parts.

In operation, the driver depresses pedal 14, causing lever 2 to turn about stud 10. The lever 2, when depressed, pulls upwardly on the lower end of the band 1, and downwardly on the upper end of the band 1. This action contracts the band 1 around the drum 4, causing a braking action. The spring 11 returns the pedal to normal position when released by the driver.

The embodiment shown and described is for the purpose of illustration only. The drawings and description, are, therefore, to be considered in an illustrative and not in a limiting sense for it is obvious that many modifications and adaptations will readily occur to and may be made by those skilled in the art without departing from the spirit and scope of the invention, as defined by the appended claims.

The invention claimed is:

1. A unitary braking mechanism for a vehicle having a brake drum rigidly fastened to a wheel hub thereof, comprising a brake band, a bracket supporting the brake band in operative relation to the brake drum, an actuating lever pivoted on the bracket and connected with the ends of the brake band, and a foot pedal rigidly fastened to the actuating lever.

2. A unitary braking mechanism for a vehicle having a brake drum rigidly fastened to a wheel hub thereof, comprising a bracket, means to fasten the bracket to the wheel axle, a brake band carried by the bracket and arranged to cooperate with the brake drum, an operating lever pivoted on the bracket and connected with the ends of the brake band, and a foot pedal rigidly fastened to the actuating lever.

3. A brake for a motorcycle and the like comprising a brake band, a support therefor, a brake actuating lever mounted solely on the support, and means for detaching the brake band, support and lever from the motorcycle as a unit.

4. A brake for a motorcycle and the like comprising a band, a support therefor, a pivot pin on the support an actuating lever for the band mounted solely on the pin, a coil spring surrounding the pin and connected to the actuating lever and support to hold the band normally out of engagement with a brake drum, and means for attaching the band, support and lever to the motorcycle as a unit.

5. In combination with a vehicle having a main frame supported by a wheel and axle, a drum fastened to the wheel, a brake cooperating with the drum, a support for the brake carried by the wheel axle, means to attach one end of the support to the main frame, and a brake actuating lever pivoted on the support.

6. In combination with a cycle wheel and axle, a brake, an actuating lever therefor, a foot pedal rigidly fastened to the actuating lever, and a bracket supporting the brake and actuating lever and mounted on the axle.

7. In combination with a wheel and axle, a main frame supported thereby, a brake drum fastened to the wheel, a brake adapted to act upon the drum to arrest the wheel, an actuating lever adjustably connected to the brake, a bracket supporting the brake and lever mounted on said axle, and means to fasten one end of the bracket to the main frame.

8. In combination with a vehicle wheel having a brake drum, a brake band, a bracket supporting the brake band in operative relation to the brake drum, a brake actuating lever carried by the bracket, and means for attaching the bracket to the vehicle with the bracket mounted on the wheel axle and having one end secured to the vehicle frame.

9. In combination with a vehicle wheel, a brake band, a support for the brake band comprising a bracket carried by the axle of the wheel, a brake actuating lever carried by the bracket, a foot pedal rigidly fastened to the lever, and means rigidly fastened to the vehicle frame and engaging the bracket to prevent the latter rotating with the wheel.

10. A brake for a motorcycle and the like comprising a band adapted to grip the drum of the motorcycle wheel, a support for the band mounted on the axle of the wheel and connected to the motorcycle frame, and a band actuating lever carried solely by the support.

11. A unitary braking mechanism for a vehicle having a brake drum fastened to a wheel comprising a brake band, a brake actuating lever, a bracket supporting the brake band and actuating lever, and means for fastening the wheel and bracket as a unit to the vehicle.

12. In combination with a motorcycle having a driving wheel, an axle therefor, a brake drum secured to the wheel, a brake adapted to engage the drum, a support for the brake carried by the axle of the wheel, means to connect one end of the support to the motorcycle frame and a brake actuating lever pivoted to the support and carried solely thereby.

13. A brake for a vehicle having a driving wheel axle therefor and a frame supported by the wheel, comprising a brake drum fastened to the wheel, a brake band to cooperate with the brake drum, a bracket to support the band in operative relation to the drum, said bracket having an opening intermediate its ends through which the axle extends to support the brake, means to connect one end of the brake to the frame, and a brake actuating lever carried solely by the bracket and pivoted thereto and connected to the brake band.

14. A brake comprising a drum to be mounted on a wheel axle, a brake band for said drum, a bracket having means for supporting the band intermediate the ends thereof, and a foot pedal pivoted on said bracket and connected to the band for actuating the same.

15. A brake comprising an axle removably connected to a vehicle, a drum on said axle, a brake band for said drum, and a foot pedal connected to said band and removable with said axle from said vehicle.

16. A brake comprising an axle, a bracket mounted on said axle having a band support and a lever support, a lever for operating said band mounted on said bracket, and a cycle frame mounted on said axle outside said bracket having releasable holding means for said bracket whereby said axle, bracket band and lever may be removed from said frame as a unit.

17. In combination, a motorcycle frame, a brake band, a lever connected to said band having a foot pedal, and a guide for said lever.

18. In combination, a motorcycle frame, a brake band, and a lever having a foot pedal thereon, said lever being pivoted adjacent said band and connected thereto.

19. In combination, a motorcycle frame, a brake band, a lever connected to said band having a foot pedal, and a guide mounted on said frame for preventing lateral displacement of said lever.

20. In combination, a motorcycle frame, a brake band, a lever connected to said band having a foot pedal, a guide mounted on said frame for preventing lateral displacement of said lever, and an auxiliary foot rest.

21. A brake comprising an axle, a bracket mounted on said axle having a band support and a lever support, a lever for operating said band mounted on said bracket, a cycle frame mounted on said axle outside said bracket having releasable holding means for said bracket whereby said axle, bracket band and lever may be removed from said frame as a unit, and a guide on said frame for the free end of said lever.

22. In a motorcycle, the combination of a brake lever, a guide for the brake lever comprising means for preventing lateral displacement of the lever, and a foot rest on said guide.

In witness whereof, I have hereunto subscribed my name.

WILLIAM S. HARLEY.